(12) United States Patent
Ohmi et al.

(10) Patent No.: US 6,289,923 B1
(45) Date of Patent: Sep. 18, 2001

(54) GAS SUPPLY SYSTEM EQUIPPED WITH PRESSURE-TYPE FLOW RATE CONTROL UNIT

(75) Inventors: Tadahiro Ohmi, 1-17-301, Komegahukuro 2-Chome, Aoba-ku, Sendai-shi, Miyagi 980-0813; Satoshi Kagatsume, Nirasaki; Nobukazu Ikeda, Osaka; Kouji Nishino, Osaka; Kazuhiro Yoshikawa, Osaka; Eiji Ideta, Osaka; Ryousuke Dohi, Osaka; Tomio Uno, Osaka; Michio Yamaji, Osaka, all of (JP)

(73) Assignees: Fujikin Incorporated, Osaka; Tadahiro Ohmi, Miyagi; Tokyo Electron Ltd., Tokyo, all of (JP)

( * ) Notice: Subject to any disclaimer, the term of this patent is extended or adjusted under 35 U.S.C. 154(b) by 0 days.

(21) Appl. No.: 09/463,514
(22) PCT Filed: May 27, 1999
(86) PCT No.: PCT/JP99/02836
 § 371 Date: Jun. 2, 2000
 § 102(e) Date: Jun. 2, 2000
(87) PCT Pub. No.: WO99/63412
 PCT Pub. Date: Dec. 9, 1999

(30) Foreign Application Priority Data
May 29, 1998 (JP) .................................................. 10-150049

(51) Int. Cl.⁷ ............................................................ G05D 7/06
(52) U.S. Cl. ........................ 137/486; 137/487.5; 251/118
(58) Field of Search ............................ 137/486, 487.5; 251/118

(56) References Cited

U.S. PATENT DOCUMENTS

| | | | |
|---|---|---|---|
| 4,828,219 | * 5/1989 | Ohmi et al. | 251/118 |
| 5,025,952 | * 6/1991 | Carlson et al. | 251/118 X |
| 5,485,984 | * 1/1996 | Itoi et al. | 251/331 |
| 5,524,865 | * 6/1996 | Uchisawa et al. | 251/331 |
| 5,669,408 | * 9/1997 | Nishino et al. | 137/486 X |
| 5,816,285 | * 10/1998 | Ohmi et al. | 137/487.5 |
| 6,105,933 | * 8/2000 | Kanno et al. | 251/331 |

\* cited by examiner

*Primary Examiner*—Gerald A. Michalsky
(74) *Attorney, Agent, or Firm*—Griffin & Szipl, P.C.

(57) ABSTRACT

An improved and reduced-size and low-cost gas supply system equipped with a pressure-type flow rate control unit, to be used, for instance, in semiconductor manufacturing facilities is disclosed. Transient flow rate characteristics are improved to prevent the gas from overshooting when the gas supply is started, and to raise the flow rate control accuracy and reliability of facilities. That eliminates non-uniformity of products or semiconductors and raises the production efficiency. The gas supply system equipped with a pressure-type flow rate control unit is so configured that with the pressure on the upstream side of the orifice held about twice or more higher than the downstream side pressure, the gas flow rate is controlled to supply the gas to a gas-using process through an orifice-accompanying valve, the gas supply system comprising a control valve to receive gas from the gas supply source, an orifice-accompanying valve provided on the downstream side of the control valve, a pressure detector provided between the control valve and the orifice-accompanying valve, an orifice provided on the downstream side of the valve mechanism of the orifice-accompanying valve and a calculation control unit where on the basis of the pressure P1 detected by the pressure detector, the flow rate Qc is calculated with an equation $Qc=KP1$ (K: constant) and the difference between the flow-rate specifying signal Qs and the calculated flow rate Qc is then input as control signal Qy in the drive for the control valve, thereby regulating the opening of the control valve for adjusting the pressure P1 so that the flow rate of the gas to supply can be controlled.

7 Claims, 10 Drawing Sheets

GAS SUPPLY SYSTEM EQUIPPED WITH PRESSURE-TYPE FLOW RATE CONTROL UNIT

BACKGROUND OF THE INVENTION

1. Field of the Invention

The present invention relates to an improved gas supply system equipped with a pressure-type flow rate control unit for use in semiconductor manufacturing facilities and chemical manufacturing plants. More particularly, the present invention relates to a gas supply system reduced in size and improved in flow rate control and other performances.

2. Description of the Prior Art

The mass flow rate controller has been widely used for gas flow rate control in the gas supply system in semiconductor manufacturing facilities.

But the mass flow rate controller has presented a number of problems in practice including high manufacturing costs, slow response, product-to-product control precision non-uniformity, and low control stability.

Similarly, the metal diaphragm valve of the air-driven type has found wide acceptance as a valve to control the supply of gas from the gas supply source to gas-using processes. But this valve is slow to open and close, which lowers reliability of the quality of the finished products, i.e., semiconductors, and fails to raise the production efficiency of semiconductors and other products.

Earlier, the applicants of the present invention developed a gas supply system using a pressure-type flow rate controller and a high-speed solenoid actuating type metal diaphragm valve which could solve all the problems with the prior art. The new supply system developed was disclosed in unexamined Japanese patent applications laid open under Nos. H08-338546 and H10-55218.

FIG. 11 shows a block diagram of a gas supply system equipped with the prior art pressure-type flow rate control unit. FIG. 12 is a vertical, sectional view showing a control valve and an orifice-accompanying valve installed together which constitutes the core of the gas supply system.

In FIGS. 11 and 12, the numeral 1 indicates a pressure-type flow rate control unit, 2 a control valve, 3 a pressure detector, 4 a temperature detector, 5 an orifice, 6 a calculation control unit, 6a an temperature correction circuit, 6b a flow rate calculation circuit, 6c a comparison circuit, 6d an amplifier circuit, 7a, 7b amplifiers, 8a, 8b A/D converters, 9 an orifice-accompanying valve, 9a a valve block and 12 a valve block. The reference letters Qs denote flow-rate specifying signal, Qc flow-rate calculation signal and Qy control signal. The operating principle of that pressure-type flow rate control system is this: The fluid pressure between the orifice 5 and the control valve 2 is measured by the pressure detector 3 with the pressure P1 on the upstream side of the orifice 5 held about twice or more higher than the downstream pressure P2. On the basis of this detected pressure P1, the flow rate Qc is calculated with an equation Qc=KP1 (K: constant) in the calculation control unit 6. The difference between the flow-rate specifying signal Qs and the calculated flow rate Qc is input in the drive 10 for the valve 2 as control signal Qy to regulate the opening of the control valve 2 for adjusting the pressure P1 upstream of the orifice 5 so that the flow rate on the downstream side of the orifice 5 is automatically regulated to the specified flow rate Qs.

The control valve 2 and the orifice-accompanying valve 9 are formed separately as shown in FIG. 12. The two valves 2, 9, which are connected to each other by means of a nipple 12a and a connecting bolt 13a, form the core of the gas supply system.

The orifice-accompanying valve 9 as used is an air-actuating type diaphragm valve or solenoid-actuating type metal diaphragm valve.

Also, in FIGS. 11 and 12, the numeral 11a indicates the gas outlet side, 11b the gas inlet side, 12a, 12b nipples, and 13b, 13a connecting bolts.

The gas supply system equipped with the known pressure-type flow rate control unit shown in FIGS. 11 and 12 was much lower in manufacturing costs and more excellent in response characteristics than the system using the prior art mass flow rate controller. Also unsurpassed by the prior art mass flow rate controller in control precision, the pressure-type flow rate control unit has an excellent usefulness in practice.

Yet, the above-mentioned gas supply system equipped with the pressure-type flow rate control unit still has some problems to solve. That which requires urgent attention is the necessity:

to further reduce size;

to so design the components that the surfaces coming in contact with gas are easy to treat, thus raising the stability and reliability of the components;

to improve the transient flow rate characteristics to prevent the so-called overshoot (transient flow-in) and keep the mixture gas from fluctuating in composition ratio, thus raising the uniformity of quality of finished products or semiconductors; and to speed up the switchover of gases to supply, thus improving the production efficiency.

SUMMARY OF THE INVENTION

The present invention seeks to solve those aforesaid problems with the known gas supply system equipped with the pressure-type flow rate control unit. And it is an object of the present invention to provide a gas supply system equipped with a pressure-type flow rate control unit that is further reduced in size and is so designed that the gas contact surfaces are easy to treat. It is another object of the present invention to provide a gas supply system equipped with a pressure-type flow rate control unit that is improved in transient flow rate characteristics to raise the quality uniformity of finished products, such as semiconductors. It is still another object of the present invention to provide a gas supply system equipped with a pressure-type flow rate control unit that is intended to speed up switchover of gases to supply for raising the production efficiency of semiconductors.

To achieve the foregoing objects, the control valve 2 and the orifice-accompanying valve 9 are formed integrally to further reduce the size of the system and to facilitate the treatment of the gas contact surfaces. In addition, the orifice 5 is placed on the downstream side of the orifice-accompanying valve 9 to improve the transient flow rate characteristics of fluid. Furthermore, the orifice-accompanying valve 9 itself is made as a small-sized quick-actuating type metal diaphragm valve to achieve a high-speed switchover of gases to supply.

To illustrate, the present invention in a preferred embodiment provides a gas supply system equipped with a pressure-type flow rate control unit which is so configured that with the pressure on the upstream side of the orifice held about twice or more higher than the downstream pressure, the gas flow rate is controlled to supply the gas to a gas-using process through an orifice-accompanying valve, the gas supply system comprising a control valve to receive gas from the gas supply source, an orifice-accompanying valve provided on the downstream side of the control valve, a pressure detector provided between the control valve and the orifice-accompanying valve, an orifice provided on the downstream side of the valve mechanism of the orifice-accompanying valve and a calculation control unit where on the basis of the pressure P1 detected by the pressure detector, the flow rate Qc is calculated with an equation Qc=KP1 (K: constant) and the difference between the flow-rate specifying signal Qs and the calculated flow rate Qc is then input as control signal Qy in the drive for the control valve, thereby regulating the opening of the control valve for adjusting the pressure P1 so that the flow rate of the gas to supply can be controlled.

The present invention in another embodiment provides the gas supply system equipped with a pressure-type flow rate control unit as defined in above, wherein the control valve is a direct touch-type metal diaphragm valve provided with a piezoelectric element actuating-type drive, wherein the orifice-accompanying valve is a direct touch-type metal diaphragm valve, and wherein the pressure detector is integrally incorporated into the valve block of the control valve.

The present invention in a further embodiment provides the gas supply system equipped with a pressure-type flow rate control unit as defined above, wherein the valve block of the control valve and the valve block of the orifice-accompanying valve are integrally formed.

The present invention in a still further embodiment provides the gas supply system equipped with a pressure-type flow rate control unit as defined above, wherein the valve mechanism of the orifice-accompanying valve is formed out of an inner disk fitted in the valve chamber of the valve block and provided with a valve seat block fitting hole in the center and a gas inflow hole in the outer periphery, a valve seat block fitted air-tight into the valve seat block fitting hole of the inner disk and defining in the center a valve seat, a gas outlet communicating therewith and an orifice for squeezing the gas outlet, and a metal diaphragm which is provided over the valve seat block and brought into and out of contact with the valve seat to close and open the fluid passage.

The present invention in an additional embodiment provides the gas supply system equipped with a pressure-type flow rate control unit as defined above, wherein the orifice-accompanying valve is a valve provided with a solenoid-actuating type drive.

The present invention in a yet additional embodiment provides the gas supply system equipped with a pressure-type flow rate control unit as defined above, wherein the orifice-accompanying valve is an orifice-accompanying valve provided with an air pressure-actuating type drive.

The present invention in a yet further embodiment provides the gas supply system equipped with a pressure-type flow rate control unit as defined above, wherein the valve seat block is provided with a ring-formed, protruded valve seat on the upper side of the disk-like body, wherein a small hole communicating with the lower gas outflow passage is made in the thin portion in the center of the ring-formed valve seat block as orifice, and wherein the portion where the orifice is made is 0.03–0.1 mm in thickness.

| LIST OF REPERENCE LETTERS AND NUMERALS | |
|---|---|
| CS | gas supply system |
| Qs | flow-rate specifying signal |
| Qc | flow-rate calculation signal |
| Qy | control signal |
| $P_1$ | pressure on the upstream side of orifice |
| $P_2$ | pressure on the downstream side of orifice |
| S | fluid passage |
| $S_1$ | gas inflow passage |
| $S_2$ | gas outflow passage |
| A | valve mechanism of the orifice-accompanying valve |
| 1 | pressure type flow rate control unit |
| 2 | control valve |
| 3 | pressure detector |
| 4 | temperature detector |
| 5 | orifice |
| 6 | calculation control unit |
| 6a | temperature correction circuit |
| 6b | flow rate calculation circuit |
| 6c | comparison circuit |
| 6d | amplifier circuit |
| 7a | amplifier |
| 7b | amplifier |
| 8a | A/D converter |
| 8b | A/D converter |
| 9 | orifice-accompanying valve |
| 9a | valve block of the orifice-accompanying valve |
| 10 | drive for the control valve |
| 11a | gas outlet side |
| 11b | gas inlet side |
| 12 | valve block of the control valve |
| 12a | nipple |
| 12b | nipple |
| 13a | connecting bolt |
| 13b | connecting bolt |
| 14a | connection screw |
| 14b | connection screw |
| 15 | connection flange |

-continued

LIST OF REPERENCE LETTERS AND NUMERALS

| | |
|---|---|
| 16a | connecting bolt |
| 16b | connecting bolt |
| 17 | drive for the orifice-accompanying valve |
| 18 | valve of the orifice-accompanying valve |
| 19 | connection flange |
| 20 | connection flange |
| 21a | connection bolt |
| 22b | oonnection bolt |
| 22a | connection bolt |
| 22b | connection bolt |
| 23 | valve chamber |
| 24 | inner disk |
| 24a | fitting hole for valve seat block |
| 24b | gas inlet |
| 25 | metal diaphragm |
| 26 | valve seat block |
| 26a | valve seat |
| 27 | valve disk press |
| 28 | shaft (valve rod) |
| 29 | spring |
| 30 | vacuum chamber |
| 31 | dry pump |
| 32 | Convectron vacuum gauge |
| 33 | pressure difference sensor |
| 34 | pressure difference sensor amplifier |
| 35 | needle valve |
| 36 | storage oscilloscope |
| 37 | N2 gas source (1 kgf/cm$^2$ G) |

DESCRIPTION OF THE PREFERRED EMBODIMENTS

Now, embodiments of the present invention will be described in detail with reference to the drawings.

Embodiment 1

Figure 1:
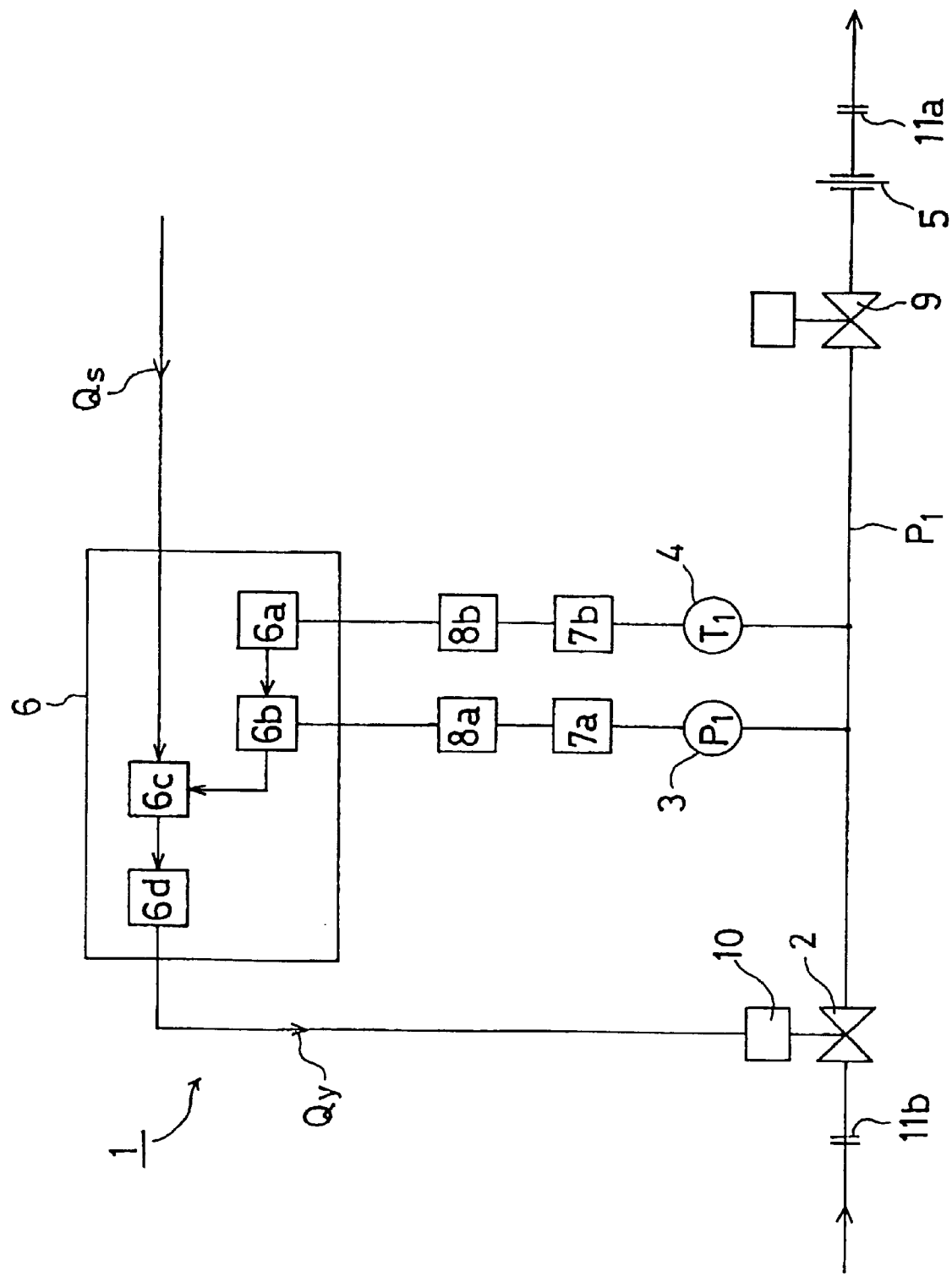
FIG. 1 is a block diagram showing the configuration of a gas supply system provided with a pressure-type flow rate control unit embodying the present invention.

FIG. 1 is a block diagram showing the basic configuration of a gas supply system equipped with a pressure-type flow rate control unit embodying the present invention and is identical with the prior art gas supply system equipped with a pressure-type flow rate control except that the orifice 5 and the orifice-accompanying valve 9 are provided at different points.

In the present invention, the orifice 5 is provided on the downstream side of the orifice-accompanying valve 9 as shown in FIG. 1. And the flow passage between the orifice-accompanying valve 9 and the orifice 5 is extremely short in distance, which will be described later.

Figure 11:
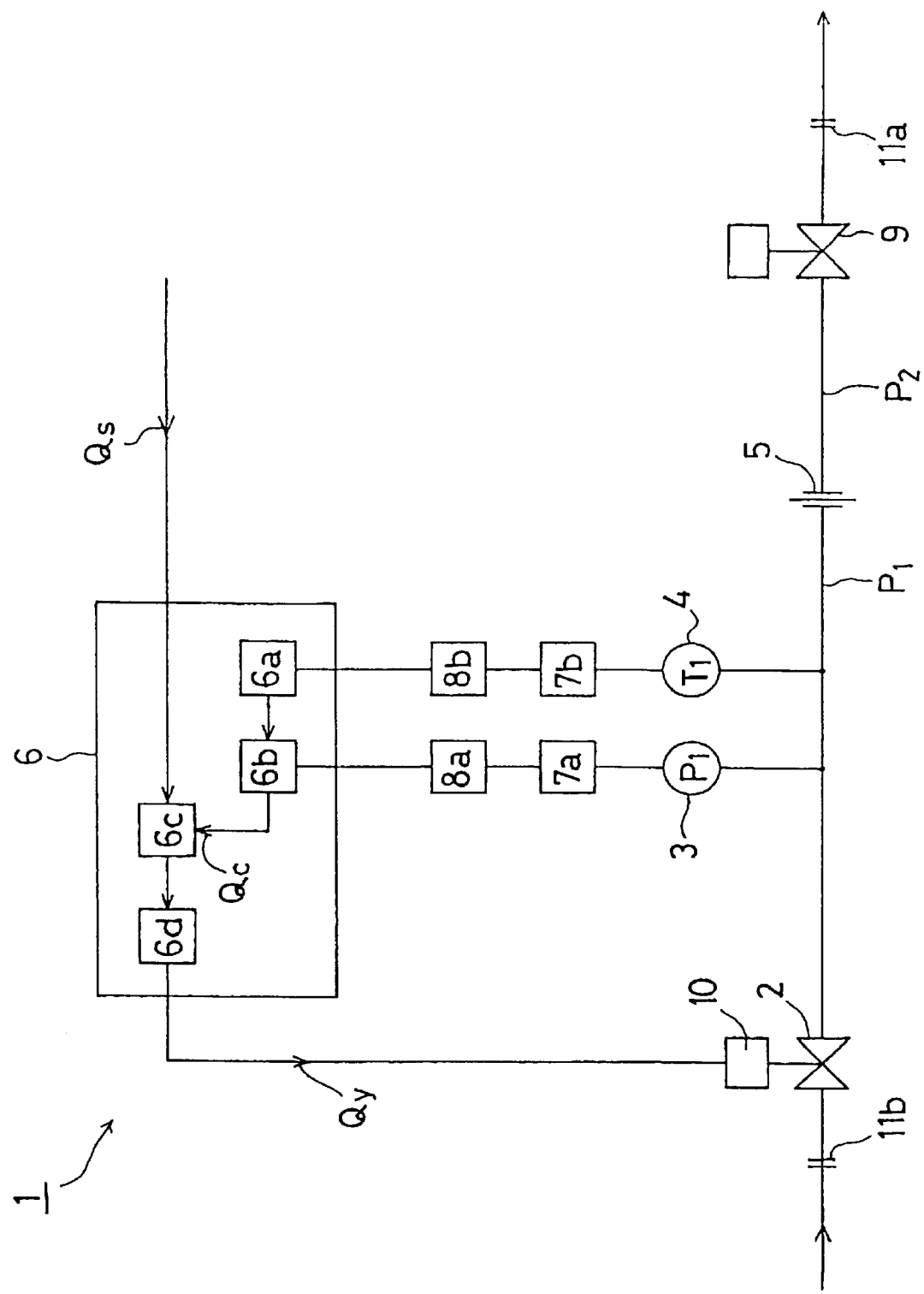
FIG. 11 is a block diagram showing a gas supply system using the prior art pressure-type flow rate control unit.
Figure 12:
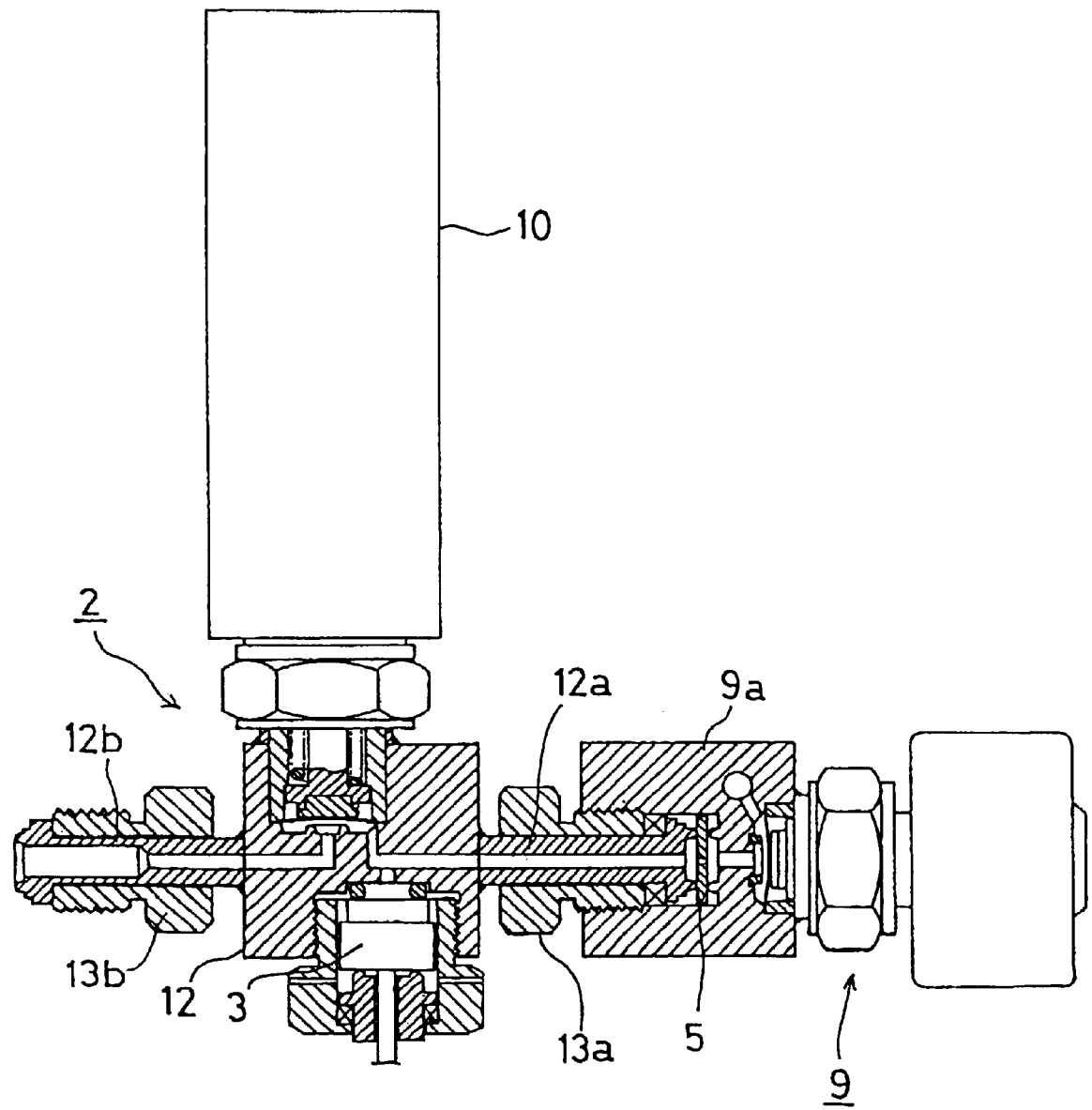
FIG. 12 is a schematic, partly sectional view showing the control valve and the pressure detector joined together in the prior art gas supply system.

The pressure-type flow rate control unit of the present invention is the same as the known pressure-type flow rate control unit as shown FIG. 11 in configuration except for the mounting positional relation between the orifice 5 and the orifice-accompanying valve 9. No explanation will be made of the identical points.

Figure 2:
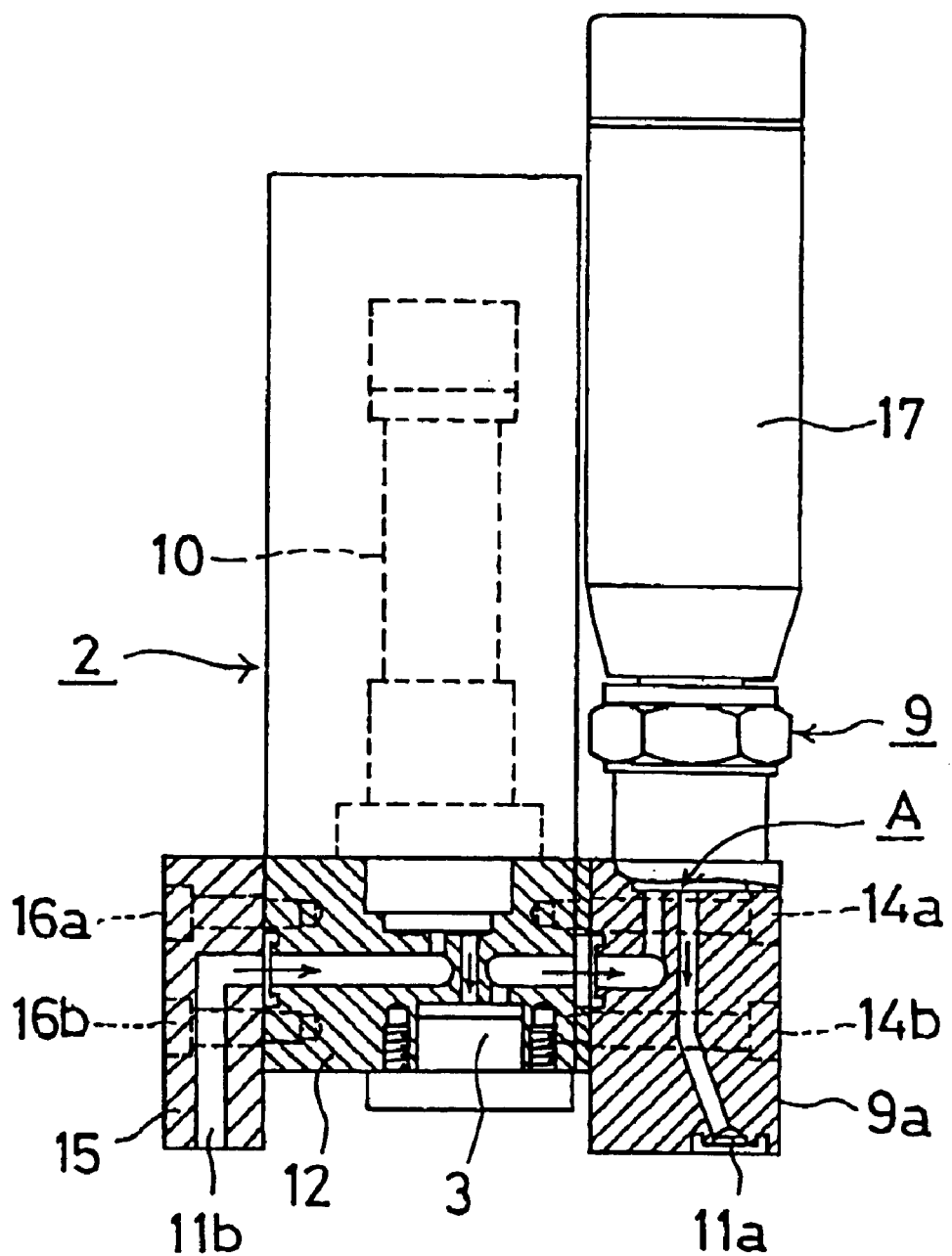
FIG. 2 is a schematic, partly sectional view showing the control valve and the orifice-accompanying valve 9 joined together which constitutes the core of the gas supply system.
Figure 3:
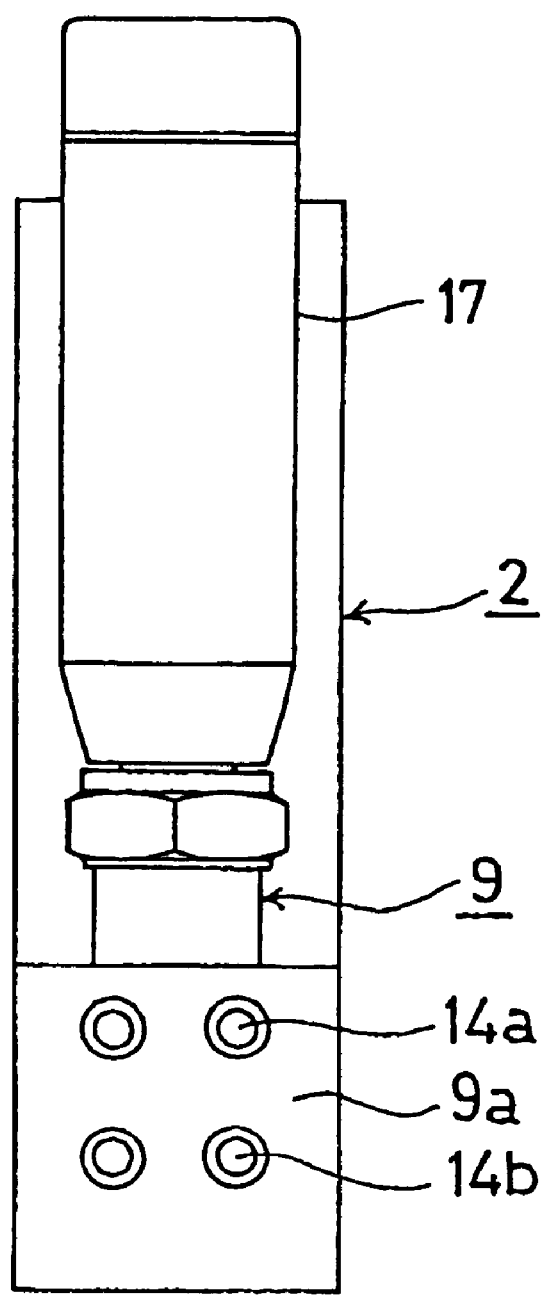
FIG. 3 is a side view of FIG. 2.

FIGS. 2 and 3 are schematic, vertical section front view and side view of the core portion of the gas supply system embodying the present invention. The valve block 12 of the control valve 2 and the valve block 9a of the orifice-accompanying valve 9 are united into one piece by connecting bolts 14a, 14b. Also, a connection flange 15 is attached air-tight to a side of the valve block 12 of the control valve 2 by means of connecting bolts 16a, 16b.

In addition, on the bottom side of the valve block 12 is provided the pressure detector 3 air-tight that detects the gas pressure P1 on the downstream side of the control valve 2. A gas inlet 11b is provided on the connection flange 15 and gas flows through the flow passage formed in the valve block 12 in the direction of the arrow.

The gas flowing out of the valve block 12 of the control valve 2 flows through the flow passage formed in the valve block 9a of the orifice-accompanying valve 9 in the direction of an arrow and passes between the diaphragm valve disk and the valve seat of the orifice accompanying valve 9. Then after passing through the orifice 5, the gas is led out through the gas outlet 11a provided at the bottom of the valve block 9a.

The control valve 2 is a direct touch-type metal diaphragm valve having a metal diaphragm as valve disk which is brought into and out of contact with the valve seat to open and close the fluid passage. The drive 10 is a piezoelectric element-type drive. The control valve 2 itself is disclosed in the aforesaid drawings and unexamined Japanese patent applications laid open under No. H08-338546. No description will be made of the valve 2 in detail.

Meanwhile, the orifice-accompanying valve 9 is of about the same construction as the control valve 2, with a direct touch-type metal diaphragm valve serving as valve mechanism A. The drive 17 for the orifice-accompanying valve 9 is a quick response-type solenoid drive having Permendur or Fe—Co alloy with a high saturation magnetic flux density as core. A solenoid plunger directly actuates the metal diaphragm valve disk. That makes it possible for a very small magnetic valve to open and close the gas passage quickly.

The construction of the orifice-accompanying valve 9 and the constitution of the drive 17 are already known. No description will be made of those parts in detail.

Embodiment 2

Figure 4:
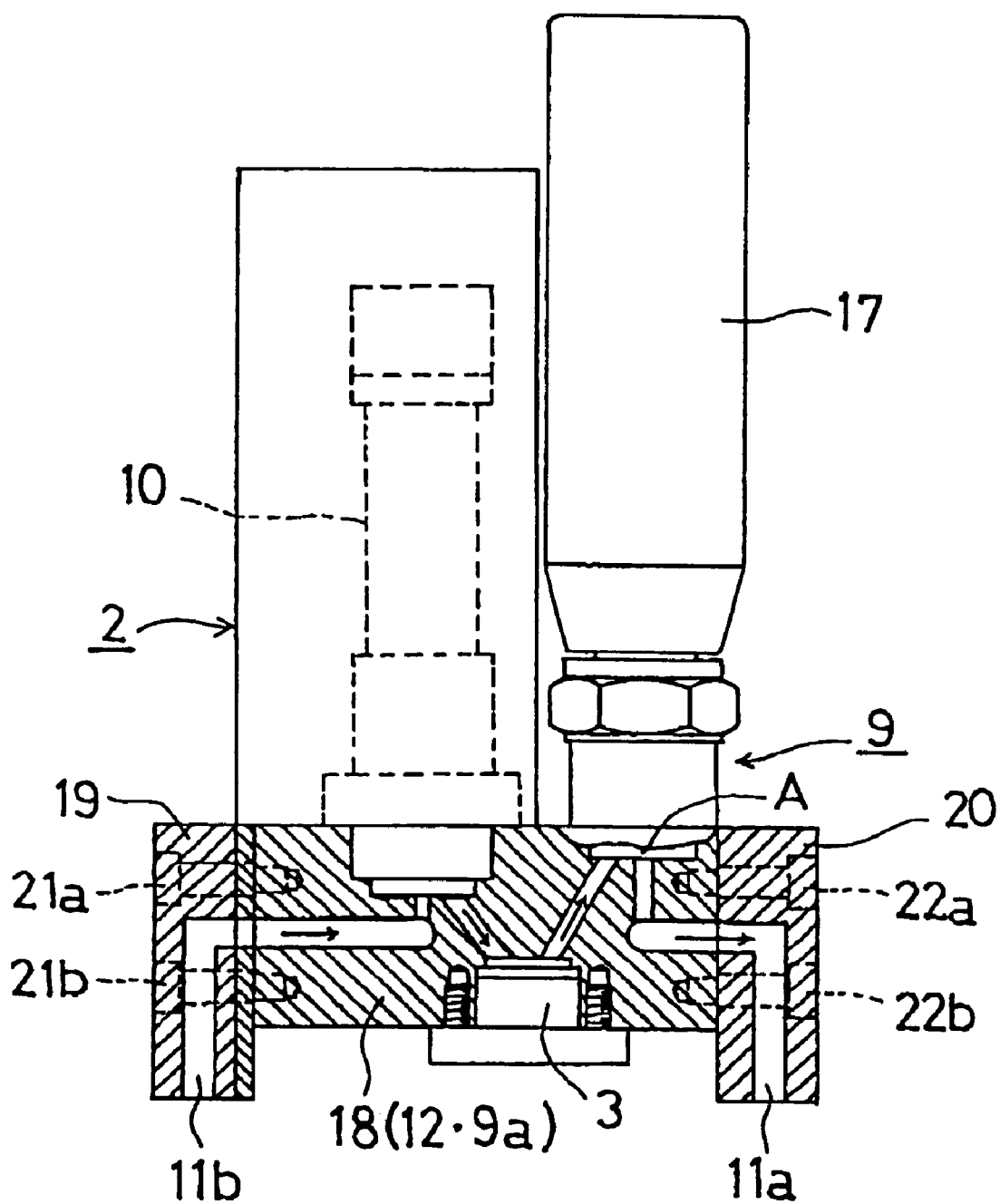
FIG. 4 is a schematic, partly sectional view showing the control valve and the orifice-accompanying valve 9 joined together in another way which constitutes the core of the gas supply system.
Figure 5:
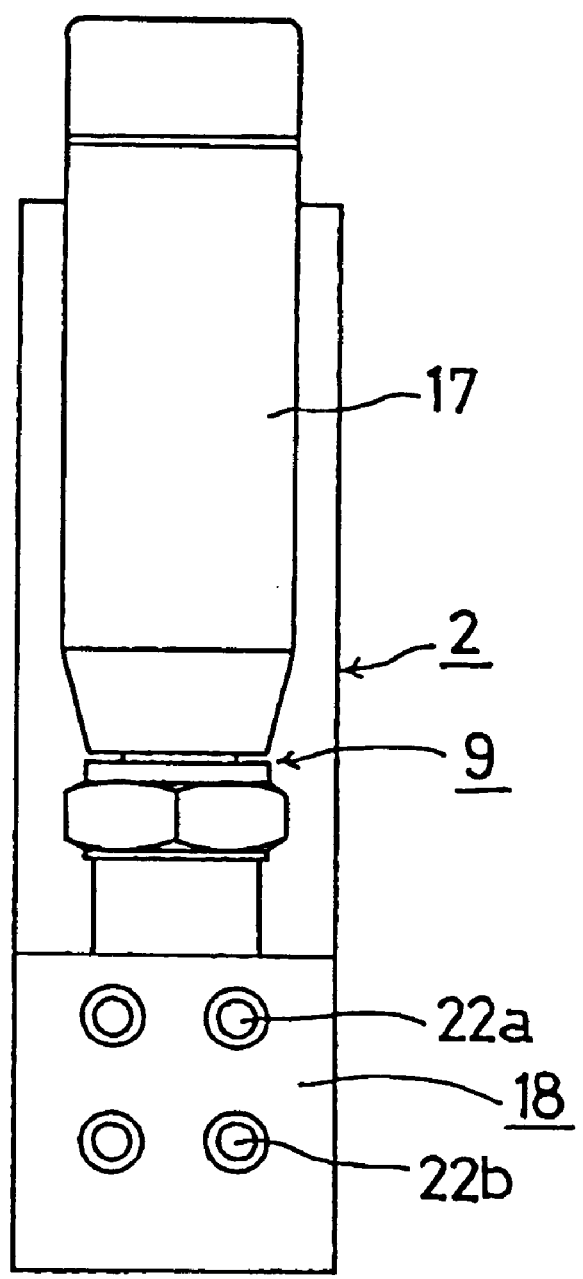
FIG. 5 is a side view of FIG. 4.

FIGS. 4 and 5 show a second embodiment of a combination of the control valve 2 and the orifice-accompanying valve 9 used in the gas supply system of the present invention. In this embodiment, the valve block 18 is formed such that the valve block 18 is an integration of the valve block 12 of the control valve 2 and the valve block 9a of the orifice-accompanying valve 9.

In the second embodiment shown in FIGS. 4 and 5, there are provided connection flanges 19, 20 on both sides of the valve block 18. Those connection flanges 19, 20 are secured airtight on the valve block 18 by means of connecting bolts 21a, 21b, 22a, 22b. Thus, a gas inlet 11b and a gas outlet 11a are formed on the bottom side of the valve block 18. The gas flowing in through the gas inlet 11b flows in the direction of the arrow and taken out through the gas outlet 11a (to the vacuum chamber, for example).

Integration of the valve block 12 of the control valve 2 and the valve block 9a of the orifice-accompanying valve 9 reduces the size of the valve itself as shown in FIGS. 2 to 5. Furthermore, that facilitates treatment to form a passive film on the inner wall of the fluid passage such as chromium oxide passive film and chromium fluoride passive film.

That helps to make the semiconductor manufacturing plant compact. In addition, it will be possible to prevent gases from getting out from inside the metal and preclude generation of metal particles due to corrosion on the inside metal wall. That in turn effectively prevents deterioration of the quality of the products or semiconductors as produced.

Figure 6:
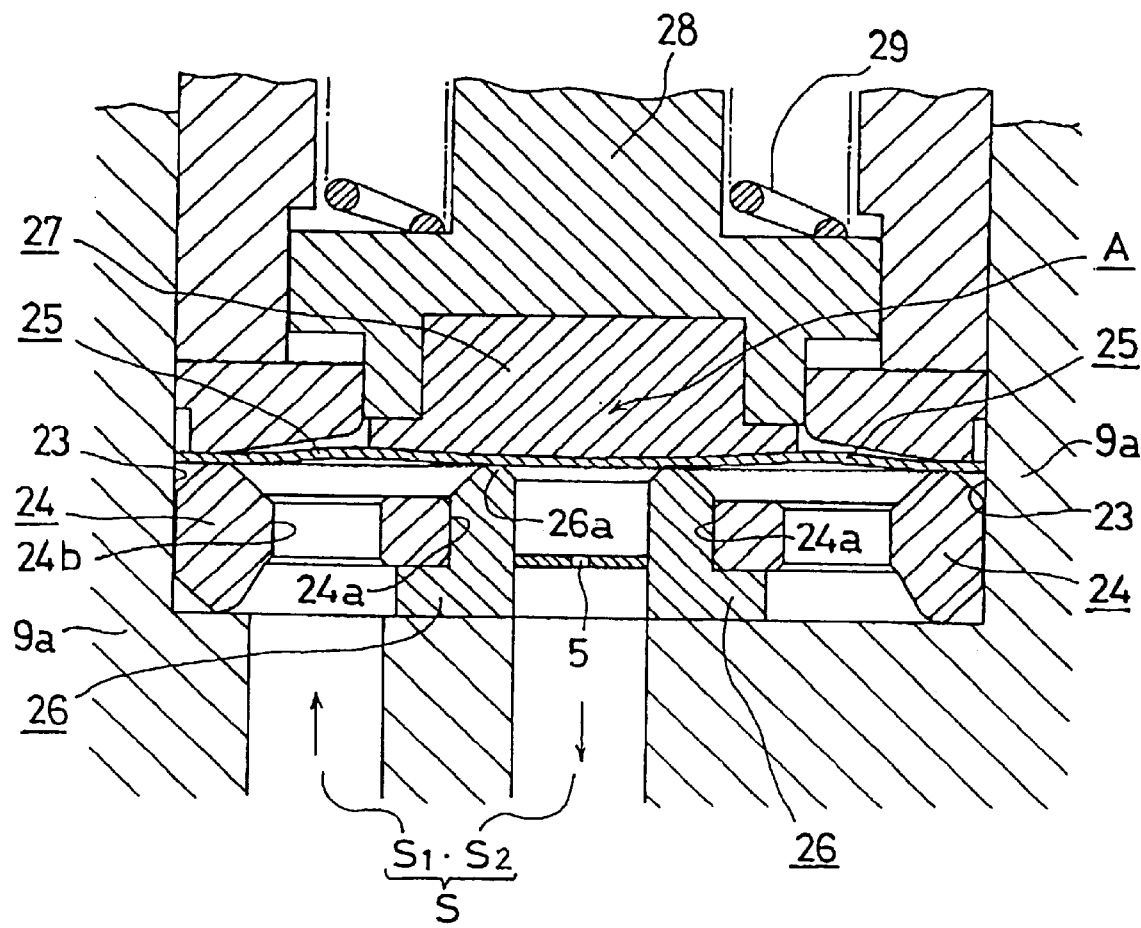
FIG. 6 is an enlarged sectional view of the valve mechanism of the orifice-accompanying valve.

FIG. 6 is a partly enlarged sectional view of the valve mechanism A of the orifice-accompanying valve 9 shown in FIGS. 2 and 4. The numeral 9a indicates a valve block, 23 a valve chamber formed in the valve block 9a, 24 an inner disk fitted into the valve chamber, 25 a metal diaphragm forming the valve disk, 26 a valve seat block made of polychlorotrifluoroethylene (PCTFE), 26a a ring-formed valve seat, 5 an orifice provided in the valve seat block, 27 a valve disk press, 28 a shaft (valve rod), and 29 a spring. The reference letter S indicates a fluid passage. The gas flowing in through a fluid passage S 1 in the direction of the arrow flows out of a fluid passage S2 through the void and orifice 5.

In other words, the valve mechanism A in the orifice-accompanying valve 9 includes an inner disk 24 fitted at the bottom of valve chamber 23 provided in the valve block 9a, a valve seat block 26 fitted airtight inside a valve seat block fitting hole 24a provided in the center of inner disk 24, a metal diaphragm 25 provided over the valve seat block 26, and a valve disk press 27 to press the diaphragm from above.

A gas inlet 24b that communicates with the gas inflow passage S1 is provided at the outer peripheral portion of the inner disk 24. The gas flows up to the space under the diaphragm 25 through the gas inlet 24b.

At the upper face of the valve seat block 26 is provided a ring-formed, protruded valve seat 26a. Also, an orifice 5 is provided in the gas outflow passage S2 which communicates with the valve seat 26a.

Figure 7:
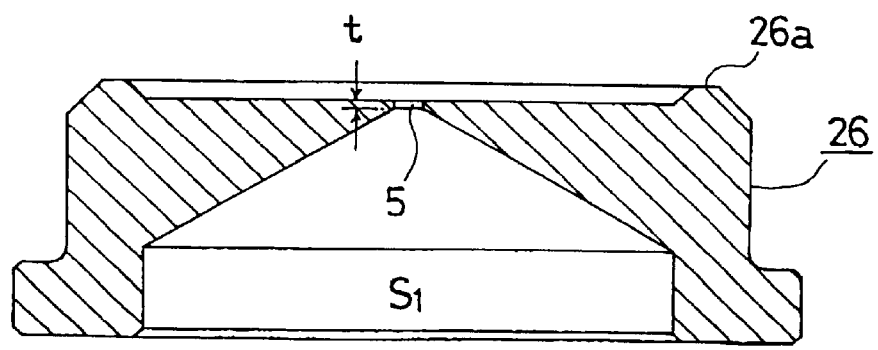
FIG. 7 is an enlarged sectional view showing another example of the valve seat block used in the orifice-accompanying valve.

FIG. 7 shows another example of the valve seat block 26 made of PCTFE other than that shown in FIG. 6. In this example, the valve seat block 26 is almost a disk-like body and has the ring-formed, protruded valve seat 26a at the upper face thereof. The back side of the disk-like body is cut in a conical form, with the center of the ring-formed valve seat block 26a thinned where a small hole or orifice 5 is formed.

The orifice 5 comes in different diameters: 0.04, 0.06, 0.12, 0.25, and 0.35 mm. A choice can be made among those diameters. It is desirable that the thickness t of the portion where the orifice 5 is formed be very small, 0.03 to 0.1 mm or so. This is because the smaller the thickness t, the smaller the gas overshoot (the transient flow rate) will be, as will be described later.

Figure 8:
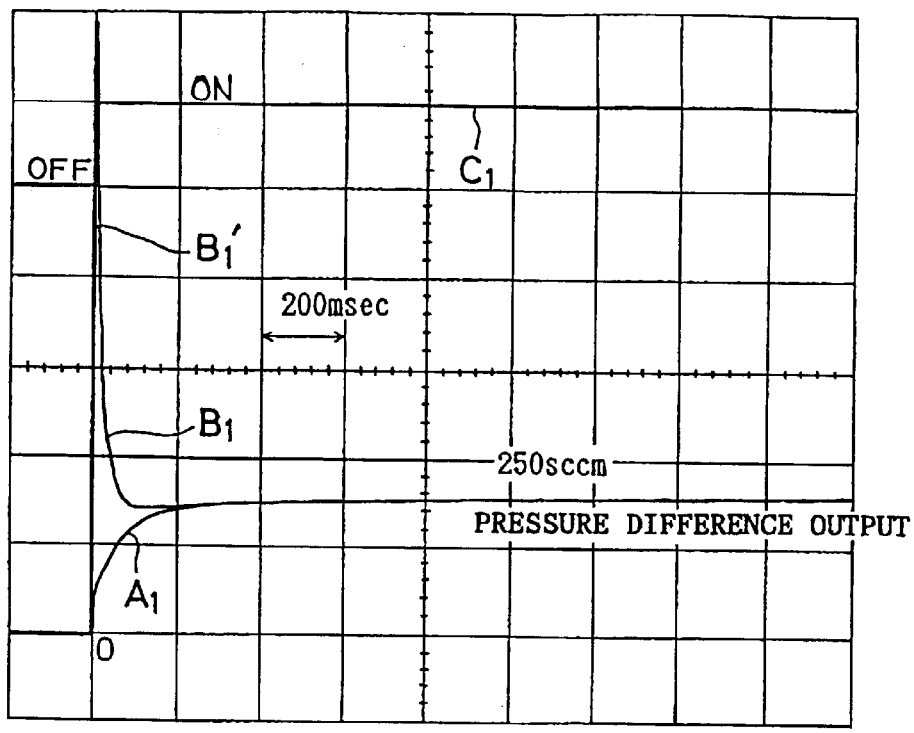
FIG. 8 depicts example transient flow rate characteristics of the gas supply system using a solenoid-actuating type orifice-accompanying valve embodying the present invention and the prior art gas supply system.
Figure 9:
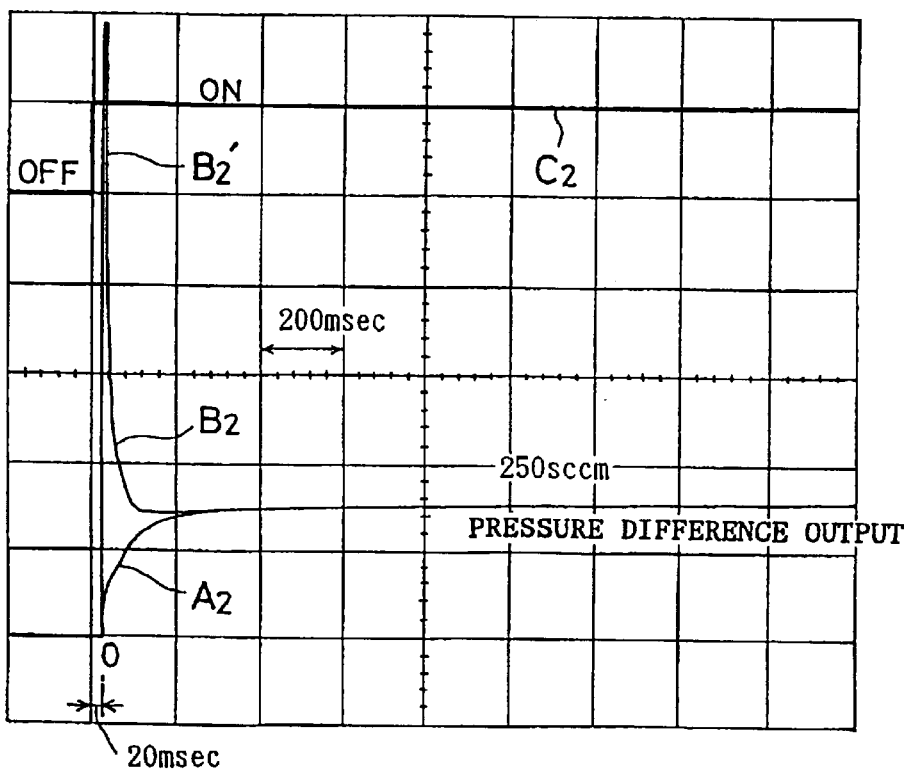
FIG. 9 depicts transient flow rate characteristics of the gas supply system using an air-actuating type orifice-accompanying valve embodying the present invention and the prior art gas supply system.

FIGS. 8 and 9 depict transient flow rate characteristics of the gas supply system equipped with a pressure-type flow rate control according to the present invention (with the orifice 5 provided on the downstream side of the valve mechanism of the orifice-accompanying valve 9) and in the prior art the gas supply system equipped with a pressure-type flow rate control (with the orifice 5 provided on the upstream side of the valve mechanism of the orifice-accompanying valve 9).

Shown in FIG. 8 are flow rate characteristics of the orifice-accompanying valve 9 provided with a solenoid actuating type drive. The curve A1 represents transient flow rate characteristics with the $N_2$ flow rate set at 250 SCCM in the gas supply system according to the present invention. The curve B1 represents those measured with the $N_2$ flow rate at 250 SCCM in the prior art gas supply system. SCCM is the unit of gas flow rate—$cm^3$/second—under the standard conditions.

FIG. 9 depicts flow rate characteristics with an orifice-accompanying valve equipped with an air actuating type drive. The curve A2 represents transient flow rate characteristics shown by the gas supply system according to the present invention, with $N_2$ set at 200 SCCM. The curve B2 represents transient flow rate characteristics with the $N_2$ flow rate set at 250 SCCM in the prior art gas supply system.

As the curve A2 in FIG. 9 indicates, the gas started to flow some 20 milliseconds after the operating signals C2 were applied in the case of the orifice-accompanying valve of the air actuating type. To shorten that delay, it is desirable to use an air actuating type orifice-accompanying valve in which the air pressure drive and the electromagnetic valve for control are built in one piece.

In FIGS. 8 and 9, the curves C1 and C2 indicate the input state of the operating signals for the orifice-accompanying valve 9. In measuring the curves A1, B1 and A2, B2, the operating signals were input to the orifice-accompanying valve 9 under the same conditions.

As shown in FIGS. 8 and 9, the flow rate curves B1 and B2 fluctuated at the time of opening the orifice-accompanying valve 9 in the prior art gas supply system. That is what is called an overshoot (the transient flow-in), which is observed at the portions indicated by B1' and B2' in the curves. Unlike the prior art gas supply system, on the other hand, the gas supply system of the present invention caused no overshoot like B1' and B2' in the flow rate curves B1, B2 when the orifice-accompanying valve 9 was opened. In the gas supply system of the present invention, the gas flow rate smoothly rises to a desired level almost instantly and thus can be controlled accurately.

Figure 10:
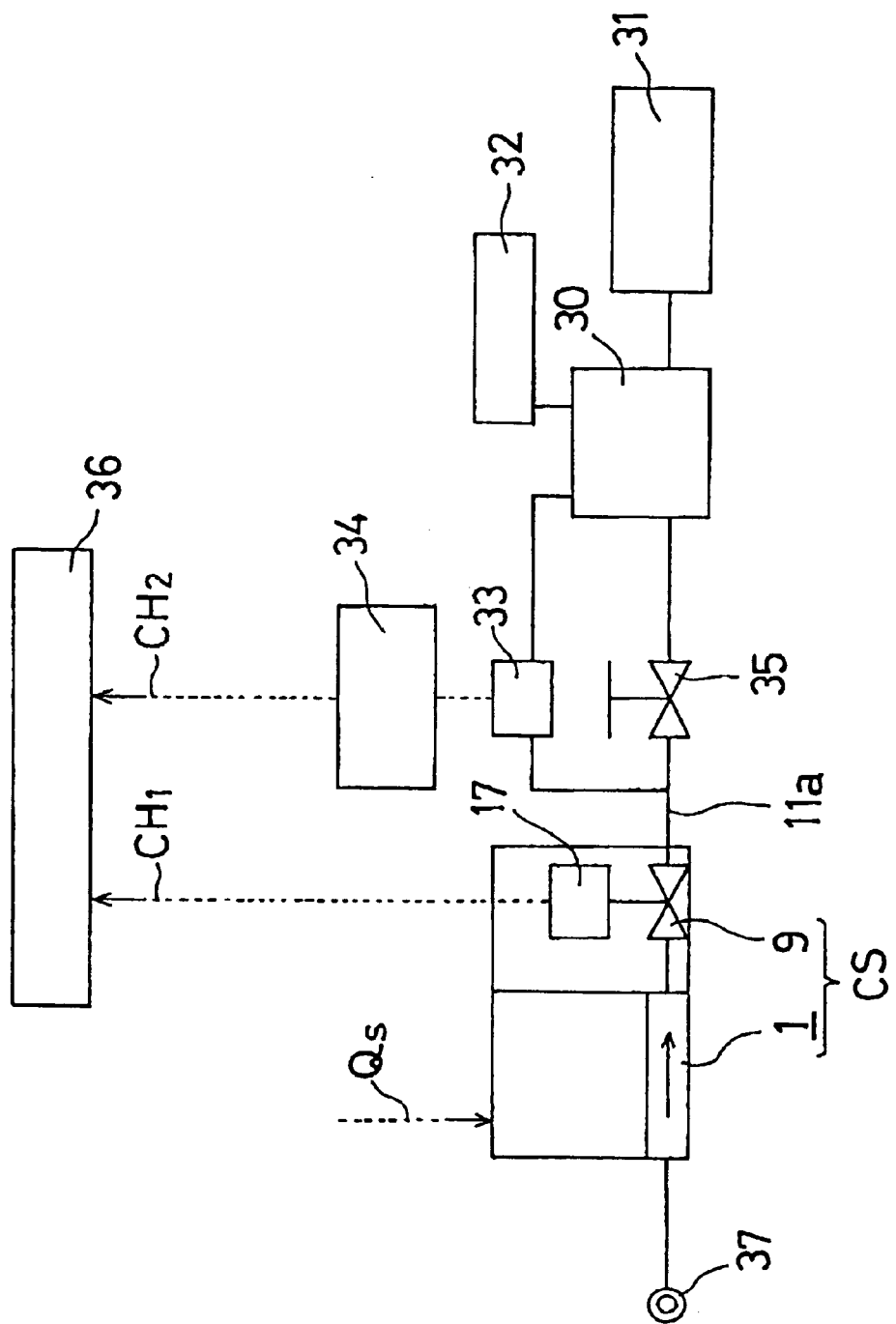
FIG. 10 is a block diagram of the testing apparatus used for determination of the transient flow rate characteristics shown in FIGS. 8 and 9.

FIG. 10 outlines the instrument for measurement of transient flow rate characteristics in the gas supply system. In making such measurements, flow rate specifying signals Qs in pressure-type flow rate control unit 1 that forms gas supply system CS were set at 5 V (with $N_2$ at 200 SCCM) in an arrangement in which orifice 5 with an inside diameter of 0.15 mm was installed on the downstream side of orifice-accompanying valve 9 in the gas supply system of the present invention and on the downstream side in the prior art. A 9.26-liter vacuum chamber 30 was provided at gas outlet 11a of orifice-accompanying valve 9. The chamber was evacuated by dry pump 31 at the rate of 16 liters/sec to maintain the degree of vacuum below 1 torr.

In FIG. 10, the numeral 32 indicates a Convectron vacuum gauge, 33 a pressure difference sensor, 34 a pressure difference sensor amplifier, 35 a needle valve (normally opened), 36 a storage oscilloscope, 37 an $N_2$ gas source (2 $kgf/cm^3G$).

Measurements were taken after the input signals to the drive 17 for the orifice-accompanying valve 9 (normally closed) began to be input to open the orifice-accompanying valve 9, and the input signals and the pressure difference output were determined by the storage oscilloscope 36. Those measurements are represented by the curves A1, A2, B1, B, C in FIGS. 8 and 9.

Installing an orifice 5 on the downstream side of the valve mechanism of the orifice-accompanying valve 9, as in the present invention, can inhibit the transient flow-in of gas. That is probably because no primary pressure gas accumulation occurs between the orifice 5 and the orifice-accompanying valve 9 when the orifice-accompanying valve 9 is closed, unlike in the prior art gas supply system.

Tests indicate that the thickness t of the orifice 5 in the present invention should be as small as possible to obtain good transient flow rate characteristics.

In the present invention, a gas supply system is configured such that an orifice 5 is provided on the downstream side of a valve mechanism A of the orifice-accompanying valve. As a result, there occurs almost no overshoot of gas when the orifice-accompanying valve is opened to start the supply of gas to the gas-using process side. This permits very accurate control of gas flow rate and can eliminate quality non-uniformity attributable to fluctuation in gas composition among products (semiconductors) manufactured using the gas supply system.

In the present invention, it is also noted, the valve block of the control valve and the valve block of the orifice-accompanying valve are incorporated into one piece and connected in function. That can substantially reduce the size of the valve assembly, the core of the gas supply system, and lowers the manufacturing costs of the gas supply system.

In the present invention, furthermore, organic incorporation of the control valve and the valve block of the orifice-accompanying valve makes the gas flow passage within the valve block relatively simple in construction. That makes it easy to coat the gas contact surface with passive film, shutting out gas release out of the metal and preventing generation of corrosion products. Thus, the reliability of the gas supply system can be raised greatly.

In addition, the present invention adopts a quick-actuating type solenoid with a high magnetic permeability Permendur as magnetic material in the drive for the orifice-accompanying valve. That reduces the size of the drive itself and allows the orifice-accompanying valve to open and close quickly. This and the above-mentioned prevention of the gas overshoot permit a substantial improvement in the operating efficiency of the process and the production efficiency of products semiconductors.

As set forth above, the present invention is highly practical for gas supply systems handling ultra-high-purity gases such as in semiconductor manufacturing facilities.

What is claimed:

1. A gas supply system equipped with a pressure-type flow rate control unit configured so that with the pressure on an upstream side of an orifice held about twice or more higher than a downstream side pressure, the gas flow rate is controlled to supply the gas to a gas-using process through an orifice-accompanying valve, the gas supply system comprising:

a control valve for receiving gas from a gas supply source, said control valve having a valve block and a drive;

an orifice-accompanying valve provided on the downstream side of the control valve, said orifice-accompanying valve has a valve block, wherein the valve block of said control valve and the valve block of said orifice-accompanying valve are integrally formed;

a pressure detector provided between the control valve and the orifice-accompanying valve;

an orifice provided on the downstream side of the orifice-accompanying valve; and a calculation control unit wherein, based on a pressure P1 detected by the pressure detector, a flow rate Qc is calculated with an equation Qc=KP1, wherein K is a constant, and the difference between a flow-rate specifying signal Qs and the calculated flow rate Qc is then input as control signal Qy into the drive for the control valve, thereby regulating the opening of the control valve for adjusting the pressure P1 so that the flow rate of the gas to supply can be controlled.

2. The gas supply system equipped with a pressure-type flow rate control unit as defined in claim 1, wherein the control valve is a direct touch metal diaphragm valve provided with a piezoelectric element actuating drive, wherein the orifice-accompanying valve is a direct touch metal diaphragm valve, and wherein the pressure detector is integrally incorporated into the valve block.

3. The gas supply system equipped with a pressure-type flow rate control unit as defined in claim 2, wherein said orifice-accompanying valve further comprises a solenoid-actuating drive.

4. The gas supply system equipped with a pressure-type flow rate control unit as defined in claim 2, wherein said orifice-accompanying valve further comprises an air pressure-actuating drive.

5. The gas supply system equipped with a pressure-type flow rate control unit as defined in claim 1, wherein said orifice-accompanying valve has a valve mechanism; wherein said valve mechanism comprises:

an inner disk fitted in a valve chamber formed in the valve block;

a valve seat block fitted air-tightly into a valve seat block fitting hole formed in the inner disk, wherein said valve seat block has a valve seat, and a gas outlet communicating therewith in the center of said valve seat block; and a metal diaphragm provided over said valve seat block and movable into and out of contact with the valve seat to close and open the fluid passage;

wherein an orifice for squeezing the gas outlet is formed integrally with said valve seat block at an upper end portion of the gas outlet of said valve seat block.

6. The gas supply system equipped with a pressure-type flow rate control unit as defined in claim 5, wherein the portion of said valve seat block wherein the orifice is formed is 0.03–0.1 mm in thickness.

7. The gas supply system equipped with a pressure-type flow rate control unit as defined in claim 1, wherein said orifice-accompanying valve has a valve mechanism; wherein said valve mechanism comprises:

an inner disk fitted in a valve chamber formed in the valve block;

a valve seat block fitted air-tightly into a valve seat block fitting hole formed in the inner disk; wherein said valve seat block has a valve seat, and a gas outlet communicating therewith in the center of said valve seat block; and a metal diaphragm provided over said valve seat block and movable into and out of contact with the valve seat to close and open the fluid passage;

wherein an orifice for squeezing the gas outlet is provided in the gas outlet of said valve seat block.

* * * * *